United States Patent [19]
Derks

[11] Patent Number: 5,724,357
[45] Date of Patent: Mar. 3, 1998

[54] REMOTE RESPONSE SYSTEM AND DATA TRANSFER PROTOCOL

[75] Inventor: Harry G. Derks, Holland, Mich.

[73] Assignee: Fleetwood Group, Inc., Holland, Mich.

[21] Appl. No.: 265,843

[22] Filed: Jun. 24, 1994

Related U.S. Application Data

[63] Continuation-in-part of Ser. No. 826,987, Jan. 28, 1992, Pat. No. 5,379,213.
[51] Int. Cl.⁶ .................... H04J 3/26; H03K 7/08
[52] U.S. Cl. .................... 370/413; 370/312; 370/349; 455/2; 455/54.2; 340/825.54; 375/238; 341/182; 434/351
[58] Field of Search .................... 370/8, 9, 10, 94.1, 370/94.2, 95.1, 95.2, 205, 212, 312, 313, 314, 349, 432, 449; 375/238, 239, 259, 274, 276; 455/2, 53.1, 54.1, 54.2; 341/60, 178, 182; 434/322, 350, 351, 352, 327, 336; 340/504, 505, 825.44, 825.52, 825.54, 825.55, 825.57, 825.63, 825.64, 311.1, 313; 379/92

[56] References Cited

U.S. PATENT DOCUMENTS

| | | | |
|---|---|---|---|
| 2,352,634 | 7/1944 | Hull | 370/77 |
| 3,245,157 | 4/1966 | Laviana | 434/307 R |
| 3,314,172 | 4/1967 | Boyett | 434/336 |
| 3,401,469 | 9/1968 | Shaver et al. | 434/307 R |
| 3,416,243 | 12/1968 | Greenberg et al. | 434/351 |
| 3,445,815 | 5/1969 | Saltzberg et al. | 340/825.14 |
| 3,454,718 | 7/1969 | Perreault | 375/276 |
| 3,491,464 | 1/1970 | Gray | 434/350 |
| 3,500,559 | 3/1970 | Jones et al. | 434/350 |
| 3,546,791 | 12/1970 | Koos et al. | 434/323 |
| 3,579,864 | 5/1971 | Littwin | 434/336 |
| 3,623,242 | 11/1971 | Hoover | 434/319 |
| 3,631,612 | 1/1972 | Westerberg | 434/336 |
| 3,676,580 | 7/1972 | Beck | 348/3 |

(List continued on next page.)

FOREIGN PATENT DOCUMENTS

| | | |
|---|---|---|
| 2108935 | 4/1994 | Canada. |
| 0556853A2 | 8/1993 | European Pat. Off.. |
| 0619663A2 | 10/1994 | European Pat. Off.. |
| 4321801C1 | 7/1974 | Germany. |
| 1078296 | 8/1967 | United Kingdom. |
| 1523753 | 9/1978 | United Kingdom. |

OTHER PUBLICATIONS

Search Report from corresponding European Application No. EP 95 30 4487.

Allowed United States patent application Serial No. 07/826, 987, filed Jan. 28, 1992, by the present inventor for a Test Scoring System and Method.

*Primary Examiner*—Hassan Kizou
*Attorney, Agent, or Firm*—Van Dyke, Gardner, Linn & Burkhart, LLP

[57] ABSTRACT

A wireless remote response system includes a base unit which retrieves user-entered responses from a plurality of remote response units, each of which is provided to a user. The base unit transmits a base data package over a wireless communication link to the plurality of remote response units, which decode the base packet and load into memory a portion of the decoded base package at each response unit. Each response unit examines the characters loaded into the memory and determines any character in the portion of the decoded base package that pertains to that particular response unit. Each remote response unit then processes any character that pertains to that particular response unit. Each bit of data exchanged between the base unit and the response unit is encoded as a particular time interval for at least one cycle of a periodic waveform by varying the time interval either between successive rising edges or between successive falling edges of the periodic waveform. Decoding is carried out by measuring the time intervals between rising edges or between falling edges of successive waveforms. It is then determined whether each measured time interval falls within one of at least two distinct non-overlapping time ranges in order to determine a value of each bit.

57 Claims, 13 Drawing Sheets

U.S. PATENT DOCUMENTS

| | | | |
|---|---|---|---|
| 3,676,939 | 7/1972 | Oberst et al. | 434/351 |
| 3,715,510 | 2/1973 | Birnbaum et al. | 370/11 |
| 3,737,858 | 6/1973 | Turner et al. | 340/870.03 |
| 3,757,035 | 9/1973 | Sullivan | 348/1 |
| 3,769,579 | 10/1973 | Harney | 348/4 |
| 3,789,136 | 1/1974 | Haith et al. | 434/323 |
| 3,803,491 | 4/1974 | Osborn | 325/53 |
| 3,810,316 | 5/1974 | Lahlou | 434/320 |
| 4,048,729 | 9/1977 | Derks | 434/320 |
| 4,052,798 | 10/1977 | Tomita et al. | 434/307 R |
| 4,057,805 | 11/1977 | Dowling | 343/225 |
| 4,076,964 | 2/1978 | Henrion et al. | 370/105.3 |
| 4,107,608 | 8/1978 | Saburi | 325/4 |
| 4,107,734 | 8/1978 | Percy et al. | 358/84 |
| 4,205,464 | 6/1980 | Baggott | 434/237 |
| 4,238,893 | 12/1980 | Komatsubara et al. | 434/351 |
| 4,290,141 | 9/1981 | Anderson et al. | 455/2 |
| 4,334,319 | 6/1982 | Gurry | 455/227 |
| 4,347,604 | 8/1982 | Saito et al. | 370/85.9 |
| 4,354,252 | 10/1982 | Lamb et al. | 340/825.54 |
| 4,365,249 | 12/1982 | Tabata | 340/825.3 |
| 4,365,267 | 12/1982 | Tsuda | 358/84 |
| 4,367,485 | 1/1983 | Hemmie | 358/86 |
| 4,377,870 | 3/1983 | Anderson et al. | 455/2 |
| 4,385,314 | 5/1983 | Yashiro | 358/84 |
| 4,392,132 | 7/1983 | Derks | 340/825.14 |
| 4,415,065 | 11/1983 | Sandstedt | 168/39 |
| 4,475,121 | 10/1984 | Yashiro | 358/84 |
| 4,477,809 | 10/1984 | Bose | 340/825.54 |
| 4,493,655 | 1/1985 | Groff | 434/351 |
| 4,584,602 | 4/1986 | Nakagawa | 358/84 |
| 4,591,906 | 5/1986 | Morales-Garza et al. | 358/84 |
| 4,639,914 | 1/1987 | Winters | 370/110.1 |
| 4,654,818 | 3/1987 | Wetterau, Jr. | 364/900 |
| 4,663,499 | 5/1987 | Duval | 375/238 |
| 4,663,744 | 5/1987 | Russell et al. | 376/76 |
| 4,667,193 | 5/1987 | Cotie et al. | 340/825.08 |
| 4,682,958 | 7/1987 | Slavik et al. | 434/335 |
| 4,689,619 | 8/1987 | O'Brien, Jr. | 340/825.08 |
| 4,691,202 | 9/1987 | Denne et al. | 340/825.54 |
| 4,789,983 | 12/1988 | Acampora et al. | 370/94.1 |
| 4,817,115 | 3/1989 | Campo et al. | 375/238 |
| 4,820,167 | 4/1989 | Nobles et al. | 434/335 |
| 4,877,408 | 10/1989 | Hartsfield | 434/350 |
| 4,910,794 | 3/1990 | Mahany | 455/67 |
| 4,918,437 | 4/1990 | Jasinski et al. | 340/825.44 |
| 4,921,464 | 5/1990 | Ito et al. | 455/34 |
| 4,926,375 | 5/1990 | Mercer et al. | 364/900 |
| 4,928,099 | 5/1990 | Drake | 340/825.28 |
| 4,937,586 | 6/1990 | Stevens et al. | 343/702 |
| 5,001,755 | 3/1991 | Skret | 380/46 |
| 5,068,787 | 11/1991 | Pipella et al. | 364/406 |
| 5,093,786 | 3/1992 | Derks | 395/800 |
| 5,226,177 | 7/1993 | Nickerson | 455/2 |
| 5,273,437 | 12/1993 | Caldwell et al. | 455/2 |
| 5,297,144 | 3/1994 | Gilbert et al. | 370/95.2 |
| 5,303,042 | 4/1994 | Lewis et al. | 348/14 |
| 5,329,620 | 7/1994 | Alford et al. | 395/200 |
| 5,357,609 | 10/1994 | Sellers et al. | 395/200 |
| 5,371,858 | 12/1994 | Miller et al. | 395/275 |

REMOTE RESPONSE SYSTEM AND DATA TRANSFER PROTOCOL

CROSS-REFERENCE TO RELATED APPLICATION

This application is a continuation-in-part of application Ser. No. 07/826,987, filed Jan. 28, 1992, by Harry G. Derks now, U.S. Pat. No. 5,379,213.

BACKGROUND OF THE INVENTION

This invention relates to a method and apparatus for retrieving, at a base unit, user responses entered in individual remote response units. The invention is particularly adapted to obtaining the individual responses of audience members to a question put to them. The invention finds application as an educational aid for determining the comprehension level of the pupils in a class and as a commercial tool for conducting audience preference polls and the like. The invention may even find application for remote order entry at restaurants, commodity trading exchanges, and the like;

A long-felt need that has eluded a practical solution is obtaining immediate feedback from audience members to a question put to them. In conducting a lecture, the instructor may wish to occasionally pose a question to the class to monitor the comprehension level. If the class response indicates a high level of comprehension, then the instructor may wish to proceed to new material. If comprehension is less than desirable, a review of the subject matter may be appropriate. In another setting, a marketing plan evaluation session may include presenting various options to a test audience and taking an immediate poll of the audience to determine preferences for various packaging designs, logos, advertisements, and the like.

Response systems are of two basic types: hard-wired, in which the remote units are interconnected with the base unit by conductors, and wireless. While the hard-wired systems provide more options for designing the circuitry in a manner to provide rapid collection of the responses, the conductors discourage anything but a permanent installation in a particular room and usually at a high installation cost. The wireless systems provide flexibility in allowing the system to be used in various settings and to be moved at will. However, the fact that wireless systems must communicate over broadcast signals tends to limit the options in a system design. The result is that speed of response is compromised, making known wireless response systems unacceptably slow in accumulating the responses, especially if the system includes a large number of remote response units, such as 250. Additionally, the number of functions possible with wireless systems has been limited.

In U.S. Pat. No. 5,093,786 entitled REMOTE RESPONSE SYSTEM, I disclosed a wireless remote response system in which a base unit transmits address words to remotely located response units. Each response unit identifies an address word assigned to that particular response unit and transmits a response entered by the user to the base unit in response to identification of its address word. The base unit determines that a valid word has been received from a response unit and sends an acknowledge message. The remote response unit assumes a first mode, or state, upon entry of a response by a user. The remote response unit continues to transmit a data message upon receipt of its unique address word until the central control unit transmits an acknowledge message to the transmitting response unit. Upon receipt of an acknowledge message, the remote response unit changes to a second, quiescent, state or mode. While such system is exceptionally reliable and fast, it is not without its drawbacks. In order to rapidly and reliably transmit address words from the base unit to the response unit and response data from the response units to the base unit, two communication channels, operating on different frequencies, are employed so that the communication from the base unit to the remote response units can occur concurrently with the communication from the remote response units to the base unit. However, separate communication channels require increased bandwidth and are not available in all countries. Furthermore, the data format in my patent is rigid and does not readily accommodate more than one character response from the user. Thus, it is limited to responding to yes/no and multiple choice questions.

SUMMARY OF THE INVENTION

It would be desirable to operate a wireless remote response system, having a large number of remote response units, on a single communication channel, in a fast and reliable manner. It would also be desirable to include more capabilities in a wireless remote response system. For example, it would be desirable to provide an indication to a user, such as a student, whether a response given to a question was a correct or incorrect response. It would additionally be desirable to provide a microphone in a remote response unit and allow a user to request audio communication from the user and the instructor, while allowing the actual control of the audio channel to be in the hands of the instructor. It would further be desirable to allow a more interactive system whereby complex messages could be provided, on an individual basis, to students in response to the correctness of their answers. It would also be desirable to retrieve student responses that are of multiple character length rather than single character responses. It would also be desirable to be able to efficiently download large blocks of text and other computer code from a central unit to the remote response units. Accordingly, it is an object of the present invention to provide a wireless remote response system which has greatly enhanced flexibility and functionality over prior systems.

The present invention provides a wireless remote response system for retrieving at a base unit responses from a plurality of users that are entered by the users in a plurality of remote response units, each user being provided with a response unit. The base unit transmits a base data package over a wireless communication link to the plurality of remote response units, which decode the base packet and load into memory a portion of the decoded base packet at each response unit. Each response unit examines the characters loaded into memory and determines any character in the portion of the decoded base package that pertains to that particular response unit. Each remote response unit then processes any character that pertains to that particular response unit. This may include, but is not limited to, assembling and transmitting a response data packet over a wireless communication link from that particular response unit to the base unit. The response data packet contains any response entered by the user.

According to another aspect of the invention, the portion of the decoded base packet loaded into memory of each remote response unit includes a plurality of characters each pertaining to a different response unit. The plurality of characters may include acknowledge characters to indicate that a valid response was previously received from the particular response unit. The plurality of characters may further include a correctness character indicative of whether a previously received response matches a correct answer in an answer key. The particular response unit may respond to the correctness character in several ways. It may merely provide an indication to the user that a correct or an incorrect answer was received. Alternatively, the portion of the decoded base data packet loaded into memory of each remote response unit may include a plurality of characters that pertain globally to all, or a group, of the response units. In this manner, a particular response unit displays a first message contained in the global characters in response to a given value of the correctness character pertaining to that particular response unit and displays a second message contained in the global characters in response to a different value of the correctness character pertaining to that particular response unit.

According to another aspect of the invention, the remote response units may be advantageously divided into groups and the portion of the decoded base data packet loaded into memory of each remote response unit may include a designation of a group of response units to which the individually pertinent characters pertain. The decoded base data packet may further include a designation of which group of remote response units are to transmit a response data packet in response to the particular base data packet transmission. In this manner, one group of response units may be receiving individually tailored messages in the same base data packet which prompts another group of response units to transmit their response data packets. The portion of the coded base data packet loaded into memory of each remote response unit may further include a plurality of characters globally pertaining to all of the response units. These global characters may be stored in memory at each of the response units for any desirable purpose, such as operating code for the microcomputers operating each response unit. In this manner, the operating code and other data for the remote response units may be downloaded from the base unit without requiring physical access to the remote response units to change out read-only-memory devices, or the like.

According to a further aspect of the invention, the base data packet may include a designation of a desired response length from the response units. Each response unit responds to this designation by assembling its response data packet to include the designated number of characters specified to make up the designated response length. In this manner, the response units may be capable of providing responses that are made up of more than one character, yet the total polling time is no longer than that necessary in order to retrieve all of the responses. In addition to assembling a response data packet, including any response entered by the user, the remote response unit may assemble a null data packet that is transmitted in response to a base data packet transmission even though a user has not entered a response. This allows diagnostics to be performed from the base unit of all of the response units in order to ensure that all of the response units are properly responding without the necessity of entering a response.

According to yet a further aspect of the invention, the base data packets and response data packets are encoded and decoded according to a unique technique. The values of each bit are encoded as a time interval for at least one cycle of a periodic waveform by varying the time period either between successive rising edges or between successive falling edges of the periodic waveform. Thus, the time period between rising edges or between falling edges of successive waveforms of a transmitted signal may be varied to encode each value of each bit. Decoding is carried out by measuring the time intervals between rising edges, or between falling edges, of successive waveforms. In a preferred form, it is determined whether each measured time interval falls within one of at least two distinct non-overlapping time ranges in order to determine a value of each bit. If a measured time interval does not fit within one of the precise ranges, it is discarded and the entire data packet is ignored. In this manner, the data transmission is exceptionally reliable because each decoded bit is accepted only if its measured time interval fits precisely within a given range. Because the data is encoded utilizing a variable time interval, the encoded packet will vary in time duration as a function of the value of the respective bits making up the packet. Preferably, in order to avoid the necessity for allotting a sufficient time window to accommodate the worse-case possibility, where the bits making up the packet all have the longest period coding, the content of each packet is examined prior to encoding to determine whether the majority of the bits would be encoded according to the greatest length. If so, the bits are inverted to be encoded according to a shorter length and an indication is passed along, with the transmitted data packet, of the inversion to ensure proper decoding at the receiving unit.

These and other objects, advantages and features of this invention will become apparent upon review of the following specification in conjunction with the drawings.

DESCRIPTION OF THE PREFERRED EMBODIMENT

Figure 1:
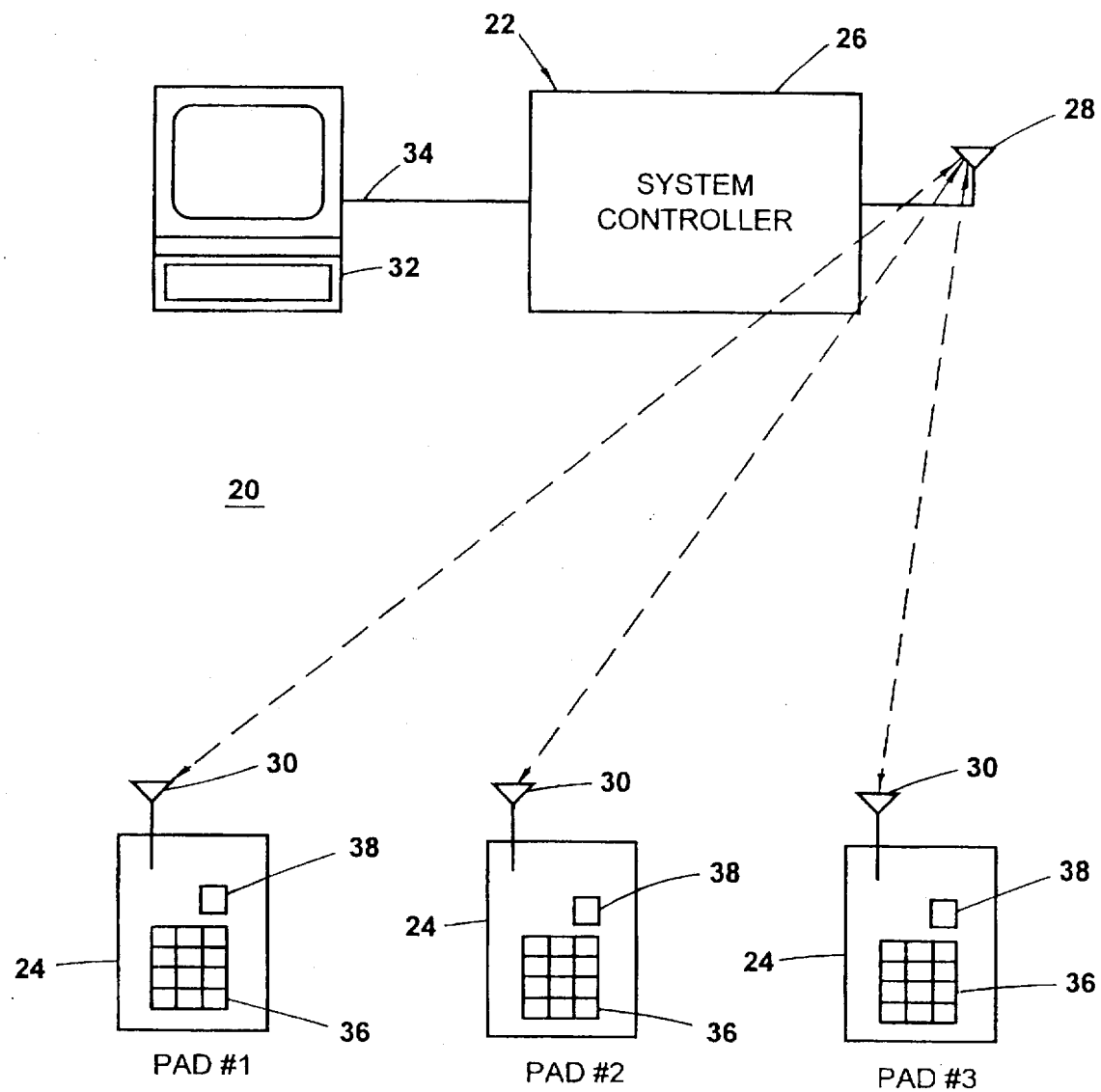
FIG. 1 is a block diagram of a wireless remote response system according to the invention.

Referring now specifically to the drawings, and the illustrative embodiments depicted therein, a wireless remote response system 20 includes an instructor base station, or base unit, 22 and a plurality of remote response units 24 (FIG. 1). Base unit 22 includes a system controller 26 having a transmitting and receiving antenna 28, which provides a wireless communication link with transmitting and receiving antennae 30 on each of the remote response unit 24. Base unit 22 further includes a personal computer 32, which allows an instructor to issue commands to system controller 26 over a wired communication channel, such as a serial channel 34. Personal computer 32 may include operating software, not forming a part of the present invention, for comparing responses received from remote response units 24 against an answer key, for tallying correct answers for each student, performing statistical analysis and the like. Base unit 22 may additionally be linked via telephone lines, or the like, with a central control area (not shown), which, in turn, is linked with multiple ones of a base unit 22. This allows the instructor to be located at a geographic distance from the classroom, or testing room, with at least a voice and data link to the room in which each base unit 22 is located.

Figure 2:
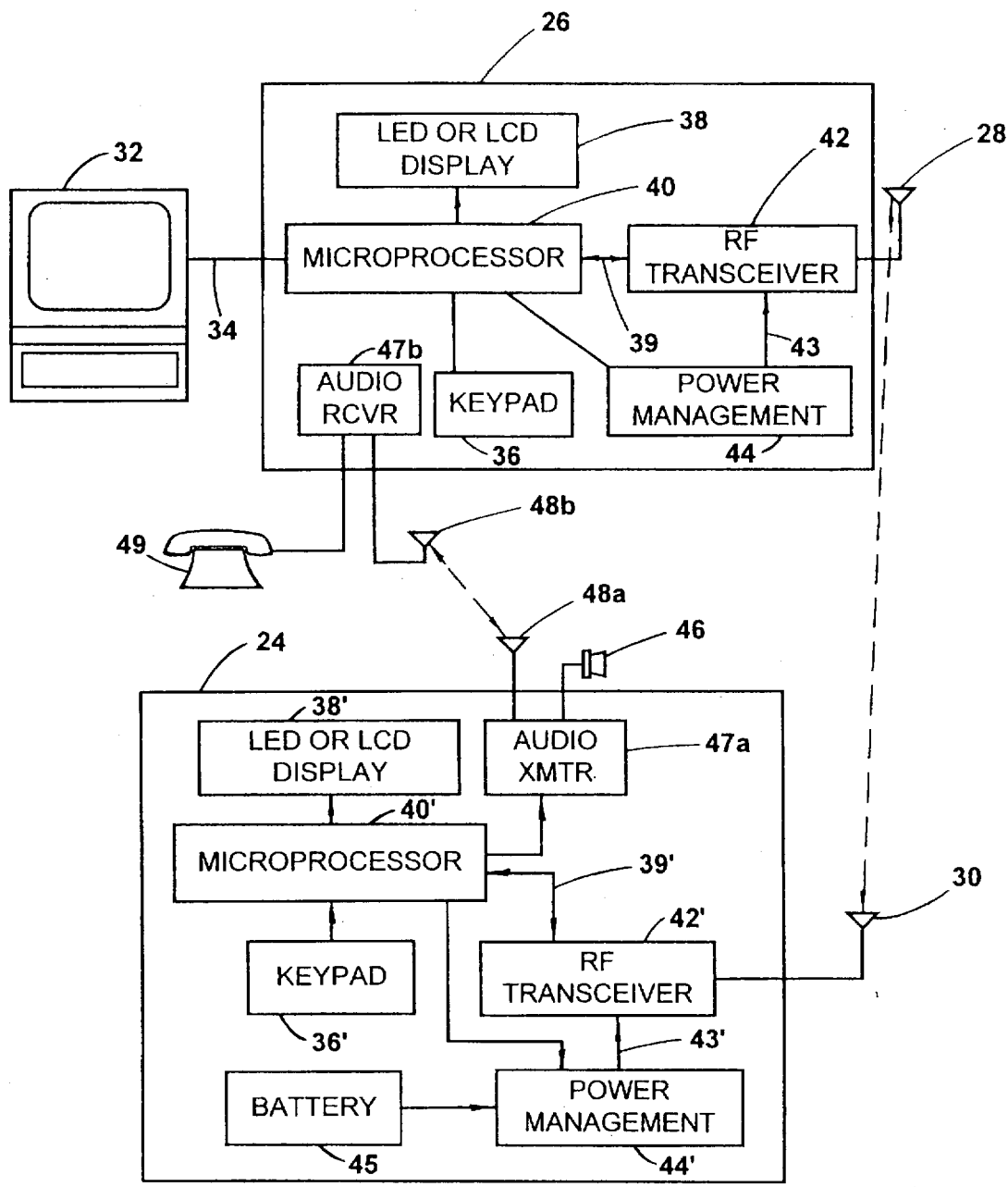
FIG. 2 is a block diagram of a system controller and a remote response unit.

Each remote response unit 24 includes an input device, such as a keypad 36, in order to receive user responses, and a display device 38 in order to display responses entered on keypad 36, as well as information transmitted from base unit 22 in a manner set forth below. In the illustrated embodiment, remote response units 24 and system controller 26 have essentially the same hardware architecture (FIG. 2). System controller 26 includes a first microprocessor or microcomputer 40, which receives serial communication over channel 34 from computer 32. Microcomputer 40 exchanges data signals over a bus 39 extending to an RF transceiver 42. A power management circuit 44, under the control of microcomputer 40, activates the transmitting circuitry of RF transceiver 42 over a line 43 only when it is time to transmit a data packet. A keypad 36 and an LED, or LCD, display 38 provide respective input and output capabilities for microcomputer 40. Likewise, remote response unit 24 includes a microcomputer 40' which has an input/output connection over a bus 39' with an RF transceiver 42' which transmits and receives signals over antenna 30. A power management circuit 44' activates the transmitting circuitry of RF transceiver 42' over a line 43' only when a transmission is to occur. A keypad 36' and display 38' provide input/output functions for microcomputer 40'. Each keypad 24 includes a microphone 46 connected with an audio transmitter 47', which, in turn, is connected through an audio communication link defined by an antenna, 48, 48' to an audio receiver 47b in system controller 26. This allows voice communication from a response unit user to the instructor. If the instructor is located at a distance from system controller 26, the audio link utilizes a telephone line illustrated at 49. The audio communication link is opened at system controller 26 and response unit 24 by the activation of transmitter 47a and receiver 47b, under the control of microcomputer 40, 40', only in response to a command from the instructor.

In the illustrative embodiment, microcomputer 40, 40' is an 8-bit microprocessor marketed by Microchip Technology under Model No. PIC 17C42 and having 2K byte internal ROM for control program storage, an internal 256 byte read-and-write memory, and 128 bytes of external electrically erasable read-only memory. In a first preferred embodiment, RF transceiver 42, 42' is a frequency modulated surface-acoustic-wave resonator device capable of transmitting and receiving at a center-band frequency of 418 MHz. The receiving circuitry includes a band-pass intermediate-frequency stage and a phase-lock-loop detector. Such transceiver is commercially available and is marketed by Radiometrix Ltd., Great Britain, under Model No. BIM-418-F.

Figure 13:
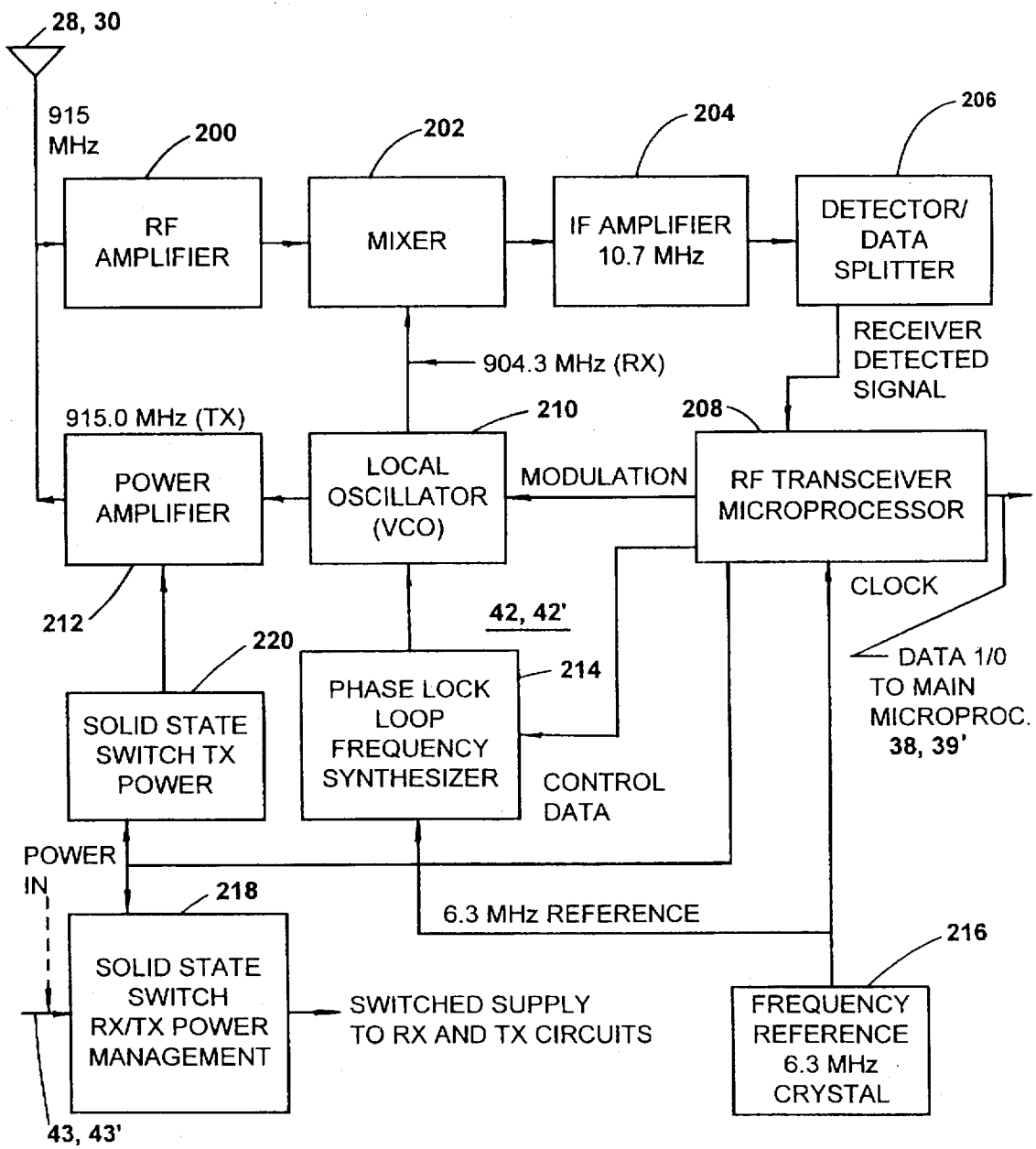
FIG. 13 is a block diagram of a transceiver useful with the invention.

In a second preferred embodiment, RF transceiver 42, 42' operates on a frequency in the band from 902 to 928 MHz (FIG. 13). Transceiver 42, 42' includes a receiving section consisting of an RF amplifier 200 and a mixer 202, which is supplied with a 904.3 MHz signal from a local oscillator 210, in order to provide an intermediate frequency signal (IF) of 10.7 MHz. The IF signal is amplified by IF amplifier 204 and supplied to a detector and data splitter 206, which produces data signals compatible with a microprocessor 208. Microprocessor 208 is interconnected by data lines 39, 39' with the respective microcomputer 40, 40'. Transceiver 40, 42' additionally includes a transmitting section including local oscillator 210, which is modulated by a data output of microprocessor 208, and a power amplifier 212, whose output is connected with antenna 28, 30. Local oscillator 210 is stabilized by a phase-lock-loop frequency synthesizer 214, which receives a reference signal of 6.3 MHz from a frequency reference 216. Power amplifier 212 is keyed on and off from a solid-state power switch 220, which is powered from a solid-state switch 218 under the control of power management circuits 44, 44' through line 43, 43'. All of the circuit components making up transceiver 42, 42' are commonly available from numerous commercial sources.

Keypad 36, 36' in the illustrated embodiment is a commercially available ten-digit membrane switch panel, which is marketed by Spectra Symbol Company of Salt Lake City, Utah. It is to be understood that input device 36 is not limited to a keypad but could be a voice recognition device, a digitizer pad, an alphanumeric keyboard, or other devices capable of receiving a user selection of a response. In the illustrative embodiment, display 38, 38' is a commercially available 24-character by 2-line display. Such display is marketed by Optrex Company of Japan under Model No. DMC24227. The FM communication link between base unit 22 and remote response units 24 is a half-duplex channel in which a base data packet 50 is transmitted by system controller 26 to all remote response units 24, and response data packets 52 are transmitted from each keypad 24 to system controller 26 individually within a time slot that is assigned to each remote response unit. As will be more apparent from the following discussion, base data packet 50 and response data packet 52 have the same essential structure.

Figure 5:
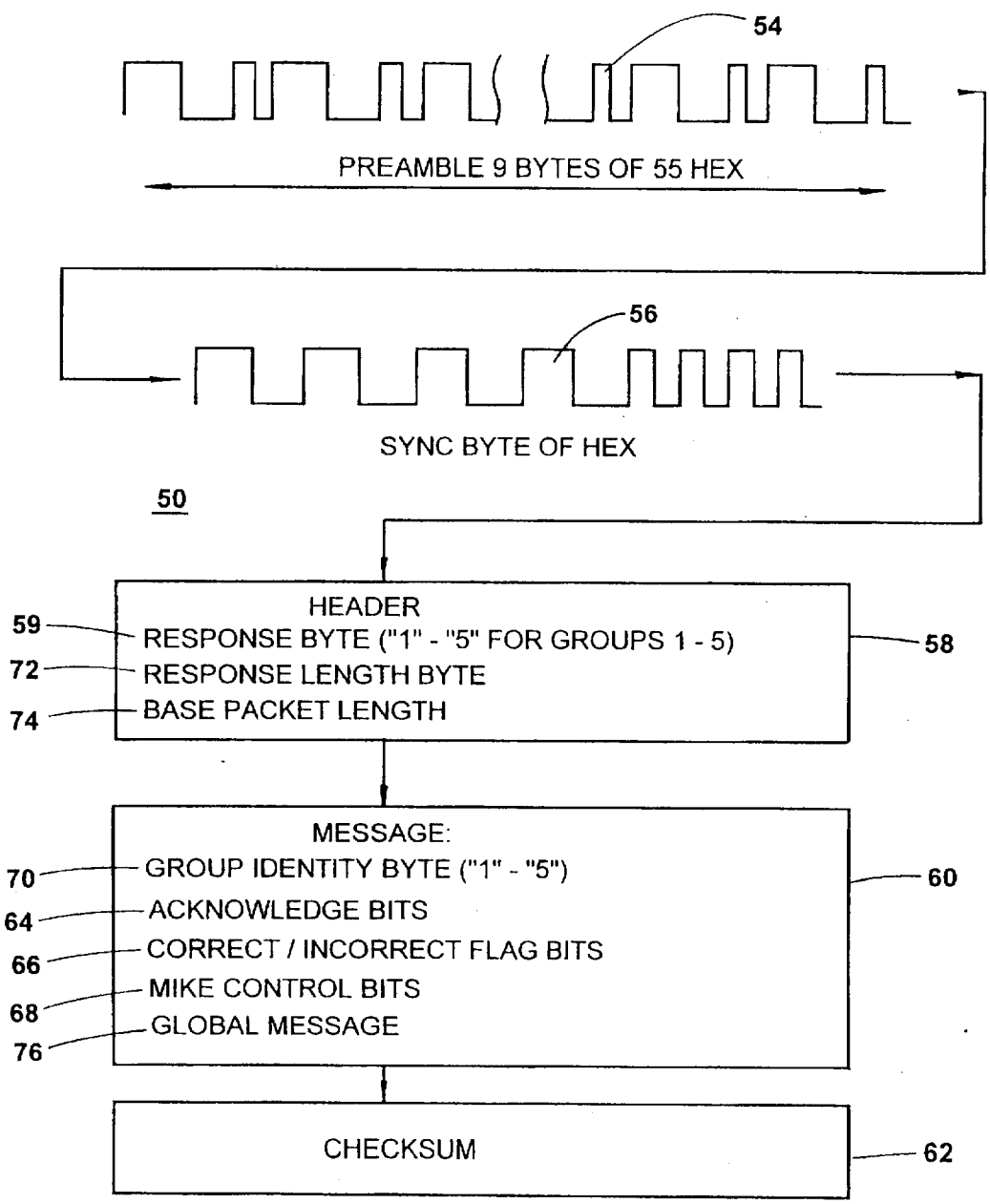
FIG. 5 is a graph illustrating the structure of a base data packet.
Figure 6:
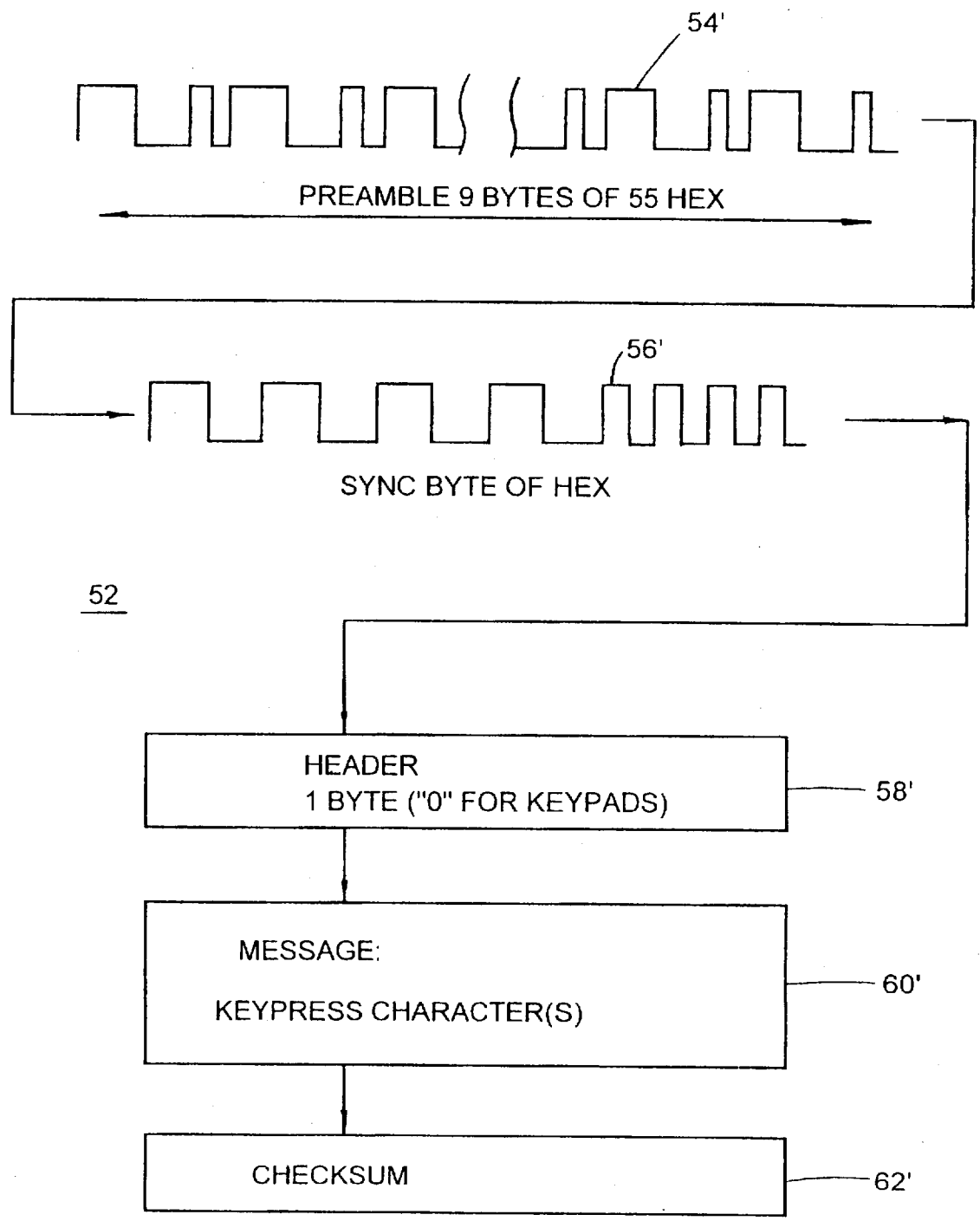
FIG. 6 is a graph illustrating the structure of a response data packet.

Base data packet 50 and response data packet 52 each include a preamble 54, 54' composed of nine bytes of 55 hex, which identifies the transmission as a data packet (FIGS. 5 and 6). The content of the preamble is sufficiently distinct to preclude false recognition resulting from various EMI sources. The preamble 54, 54' is followed by a sync byte 56, 56' which provides a timing mark for enabling the receiving units to be coordinated in their response intervals. The remaining portion of each data packet 50, 52 is made up of a HEADER 58, 58'; a MESSAGE 60, 60'; and a CHECK-SUM 62, 62'. HEADER 58 may include a one-byte response character field 59, which identifies which of five groups of remote response units 24 are to transmit a response data packet in response to that base data packet. For large groups of response units, such as 250 units, it is convenient to divide the units into groups of, for example, 50 units. This provides flexibility in system deployment of various numbers of response units by eliminating the response intervals for phantom response units. Response character field 58' includes a 0 character in order to identify the data packet as a response data packet 52.

HEADER 58 may additionally include a Response Length Byte 72, which instructs the remote response units of the number of characters to include in the MESSAGE field 60'. This allows the transmittal of responses longer than a single character under the control of the base unit. HEADER 58 may additionally include a Base Packet Length field to instruct the remote response units of the number of characters in the base data packet 50. This allows the transmitting of messages of various length globally to all response units in a Global Message field 76. MESSAGE field 60 includes a group of characters 64, 66, 68, and 70 that are individually pertinent to particular response units. The data in MESSAGE field 60 is structured so that each remote response unit is capable of identifying which character, or characters, pertains to that particular unit. However, the entire content of MESSAGE 60 is received by all remote response units and loaded into the memory thereof. Each individual remote response unit examines the character location or locations assigned to that particular unit and responds to the value of the character at that particular location.

MESSAGE field 60 includes a data structure of Acknowledge Bit fields 64, which signify to the remote response units to which each bit pertains, whether the previous response data packet transmitted by that unit was validly received at system controller 26. A field of correct/incorrect flag bits 66 identify to each remote response unit whether the response contained in the previous response data packet entered by the user was correct or incorrect. The value of the correct/incorrect flag bit is set by computer 32 by comparing received responses with a correct answer key. MESSAGE field 60 additionally includes mike control bits 68. Each mike control bit 68 may be set by the instructor via computer 32 in response to a user requesting audio communication with the instructor by entering a defined response in keypad 36. Each mike control bit 68 is assigned to a particular remote response unit in a group of remote response units and, when set, is processed by microcomputer 40'. In response to a mike control bit, microcomputer 40' actuates audio transmitter 47 for that particular remote response unit in order to provide a one-way audio communication from the remote unit user to the instructor through audio receiver 47b in system controller 26 and a transceiver to the host site over a phone line 49.

MESSAGE field 60 additionally includes a Group Identity byte 70 that may take on the value of between one and five. The group identity byte designates which of the groups of remote response units 24 the characters of MESSAGE field 60 pertain. The value of Group Identity byte 70 and MESSAGE field 60, advantageously, may be set to a different group than the Response Byte 59 in HEADER 58. Thus, for example, base data packet 50 may set MESSAGE Group Identity byte 70 at the first group (group 1) and set the Response Byte 58 at a subsequent group (group 2) whereby the group that previously responded by transmitting a response data packet may be acknowledged during a subsequent transmission in order to power down the transceiver for the remote response unit that had previously transmitted a response data packet validly received by the base unit.

MESSAGE field 60 may additionally include a Global Message field 76 containing characters which globally pertain to all, or a group of, remote response units 24. One application for Global Message field 76 is to download operating code to each microcomputer 40'. This avoids the necessity for hardware modifications to upgrade the operating software of each remote response unit 24. Another application for Global Message field 76 is in conjunction with correct/incorrect flag bits 66. Two, or more, messages could be carried in Global Message field 76, with microcomputer 40' programmed to read out one of the messages on display 38 if the correct/incorrect flag bit 66 is of a given value and a different message read-out if the flag bit is of a different value. In this manner, the student may be more thoroughly advised with respect to incorrect answers. In the illustrated embodiment, Global Message field 76 has a capacity of 200 characters. Longer strings of code may be downloaded to each microcomputer 40' through a series of transmissions.

CHECKSUM 62, 62' provides an error detection byte at the end of each base data packet or response data packet. This byte is set to the value of the least significant byte of the sum of all bytes in the respective data packet, in order to ensure that a valid reception of the packet is accomplished, as is understood by those of ordinary skill in the art.

Response data packet 52 includes the response message, or key press character(s), in MESSAGE field 60'. In one embodiment, the response in MESSAGE field 60' is a single character, which is produced by a single keystroke entered with keypad 36. Alternatively, the response in MESSAGE field 60' may be multiple characters in length, the number of characters either fixed or designated by Response Length Byte 72. This allows the system controller 26 to control the length of the response from response data packet 52. Microcomputer 40' in each remote response unit 24 responds to the value set in Response Length Byte 72 by assembling the response data packet 52 with the designated number of characters indicated by Response Length Byte 72. In this manner, responses composed of multiple character words may be collected by remote response system 20.

In another alternative embodiment, microcomputer 40' makes up the response data packet 52 including a null entry in MESSAGE field 60' if the user has not entered a response with keypad 36. When such null response data packet is utilized, each response unit 24 transmits a response data packet in response to each base data packet transmitted by the base unit irrespective of whether or not a user has entered a response. In this manner, the base unit may conduct diagnostics of each remote unit in order to determine if each remote unit is within a non-interfering communication range of the base unit.

Each remote response unit 24 is assigned a unique identification number, or address. Each remote response unit may also be assigned to one of a plurality of groups which, in the illustrated embodiment, are designated groups 1–5. The identification number and group number are retained in response unit memory. Upon receipt and decoding of a base data packet 50, each remote response unit determines, by calculation, the time interval following sync byte 56 when it is to respond. This calculation is based upon the position that the identification number for that remote response unit occupies in its group, as well as the value of base data packet length byte 74 and Response Length Byte 72. If no base data packet length byte or response length byte is utilized, a default value is used.

As previously set forth, base data packet 50 and response data packet 52 are assembled at respective system controller 26 and remote response unit 24 and frequency modulated at RF transceiver 42, 42'. The received FM transmission is received by the RF transceiver 42, 42' of the receiving unit, reduced in frequency and detected. The detected signal is an analog waveform having peaks and valleys that substantially conform to the transmitted data packet. The analog signal produced by the detector is further processed by a data slicer (not shown), which produces a waveform having better defined rise and fall points, and having an amplitude that is appropriate for processing by microprocessor 40, 40'. Microprocessor 40, 40' performs the final step in the decoding process by responding to the rising edges of the data stream provided from RF transceiver 40, 42' in order to identify 0-value bits and 1-value bits in a manner that will now be described.

Figure 3:
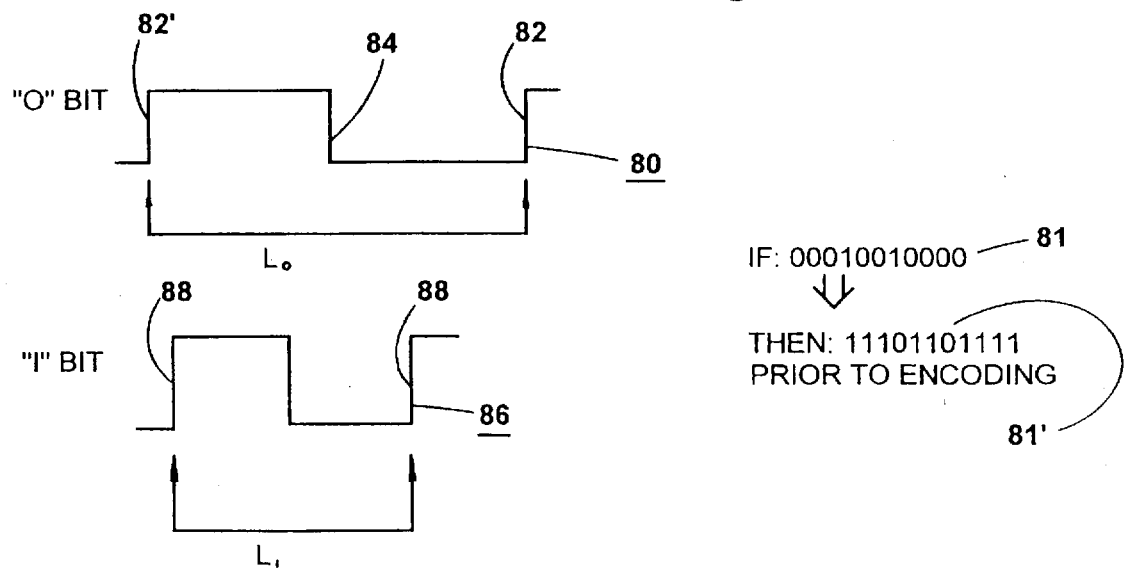
FIG. 3 is a graph illustrating an encoding scheme according to the invention.

Each bit of the base data packet and the response data packet is encoded and decoded as follows. A 0-bit 80 is composed of an entire cycle of a square wave as measured from a rising edge 82 to the subsequent rising edge 82 (FIG. 3). Alternatively, the waveform cycle could be measured from the falling edge 84 to the subsequent falling edge (not shown). The advantage of this coding technique is that, as previously described in co-pending application Ser. No. 07/826,987, filed Jan. 28, 1992, by Harry G. Derks, entitled TEST SCORING SYSTEM AND METHOD, the disclosure of which is hereby incorporated by reference, the interval between rising edges, or, alternatively, falling edges, of a transmitted data pulse is exceptionally constant whereas the interval between a rising edge 82 and a subsequent falling edge 84 is rather inconsistent and subject to environmental effects, such as signal strength and temperature. The length $L_0$ of the 0 bit is encoded at a predetermined time interval by the microprocessor 40, 40' toggling an output a predetermined repetition rate in order to generate the 0 bits. A 1-bit 86 is defined from its leading edge 88 to the leading edge 88 of the subsequent waveform. The waveform cycle has a time interval $L_1$, which is much shorter than the interval $L_0$ for the 0-bit 80. This is accomplished by generating the 1 bit by the microprocessor 40, 40' toggling its output at a predetermined frequency that is higher than that utilized to generate the 0-bit 80. It is to be understood that the above description is arbitrary with respect to which of the 0 bit and the 1 bit is encoded with a longer waveform length and that the 1 bit could be encoded at a length $L_0$ and a 0 bit at a length $L_1$. It is also within the comprehension of the invention that a bit could be encoded for multiple complete waveforms of the square wave. However, the duration of an interval $L_0$, $L_1$ starts and ends at the leading edges, or alternatively the trailing edges, on each waveform. In the illustrated embodiment $L_0$ is 185 microseconds and $L_1$ is 90 microseconds.

Because the data is encoded utilizing a variable time interval, the encoded packet will vary in time duration as a function of the value of the respective bits 81 making up the packet (FIG. 3). In order to avoid the necessity for allotting a sufficient time window to accommodate the worst case possibility, data 81 is examined prior to encoding in order to determine whether the majority of the bits, in this case 0s, would be encoded according to the greatest length. In the illustration in FIG. 3, if the 0 bit is encoded according to the greatest length, the duration required to transmit data 81 would be exceptionally long. As a result, the data 81 is inverted to 81' whereby it is made up primarily of 1 bits which are encoded according to a shorter time length. In this manner, the length of the interval required to transmit data 81 is never longer than would be required to transmit a data word made up of 50 percent of its bits encoded according to the longest duration.

Figure 4:
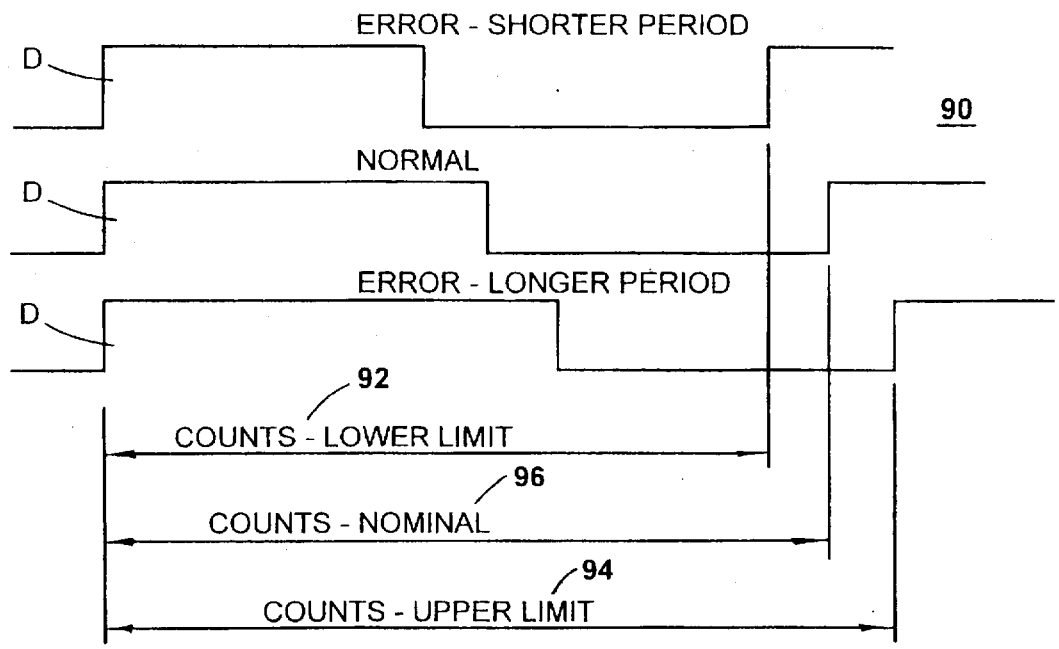
FIG. 4 is a graph illustrating a decoding scheme according to the invention.

A bit-decoding technique 90 is illustrated in FIG. 4. Microcomputer 40, 40' includes an internal counter, which counts the interval between rising edges of the bit-sliced data stream D provided from RF transceiver 42, 42'. The length of the interval, as defined in terms of the microcomputer counts is then compared with two distinct, non-overlapping ranges. A count must fall within one of the ranges in order to be decoded as a valid bit. A bit-count 92 is below the lower limit of one of the intervals and a bit count of 94 is greater than the limit of the same range. Accordingly, counts 92 and 94 would be deemed invalid unless they would fall within the other non-overlapping range, in which case the count would be decoded as the opposite bit. A count 96, which falls within one of the ranges, is decoded as a bit defined by that range. Because a bit count must be greater than the minimum of a range and less than the maximum of a range in order to be decoded as a valid bit and the ranges are non-overlapping, the possibility for erroneously decoding a bit is very small. Any bits which are erroneously decoded would likely be eliminated by the CHECKSUM calculation performed on CHECKSUM byte 62. If the receiving module cannot decode one of the bits, or if the CHECKSUM calculation is invalid, the entire received data packet is discarded and the receiving unit takes no action on that data packet. However, it is the nature of the remote response system 20 that, if one transmission is discarded, the receiving unit is fully capable of responding to a subsequent data packet. Of course, should a remote response unit be positioned with respect to the base unit 22 in a manner where communication between the two units is repetitively unsuccessful, the remote response unit must be repositioned with respect to the base unit in order to be useful. Because, according to the present invention, the remote response unit may be programmed to transmit a response data packet containing a null MESSAGE 60' if the user has not entered a response, the base unit 22 may advise the instructor that a particular remote response unit is out of range or is otherwise inoperable.

Figure 7:
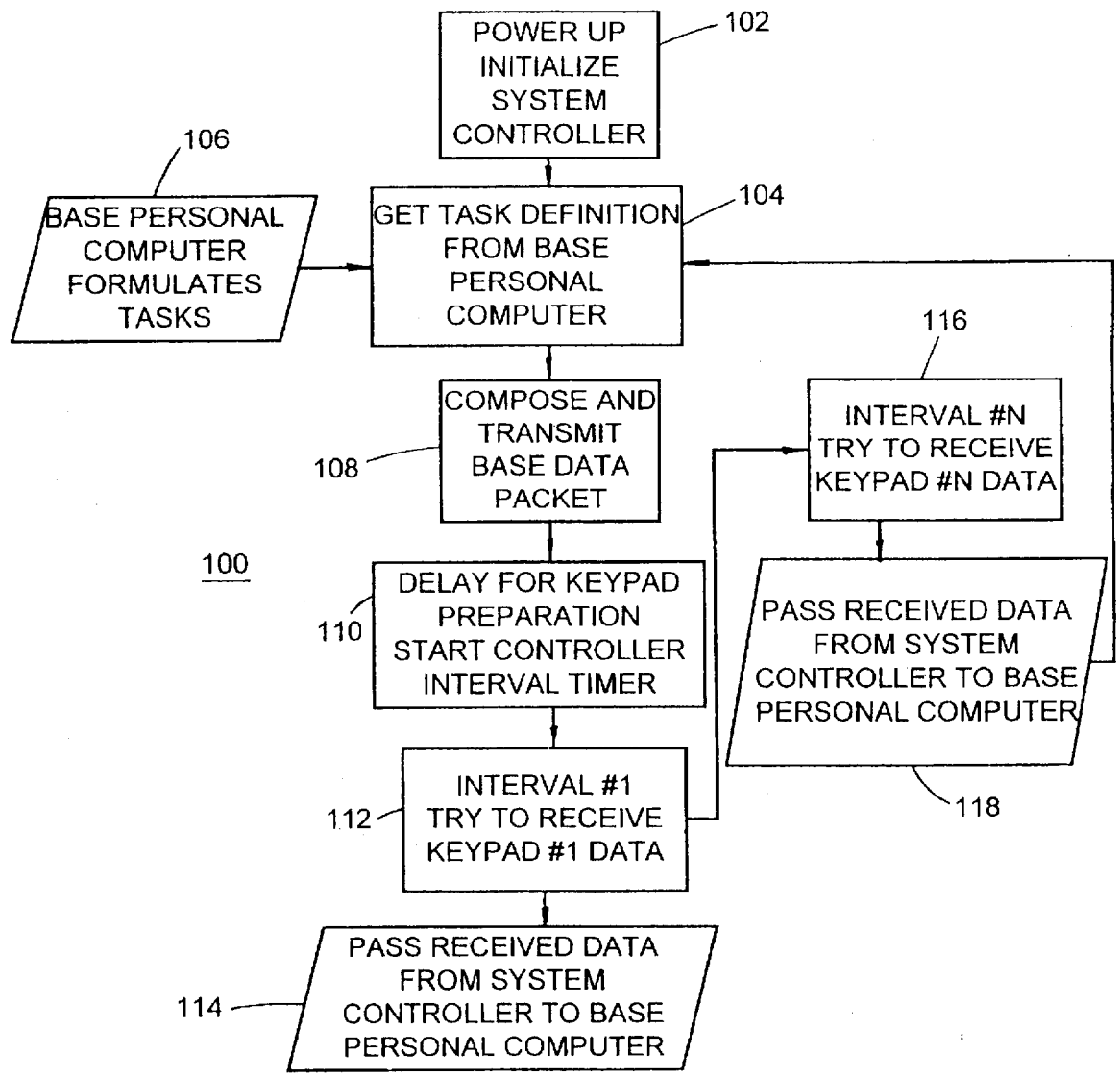
FIG. 7 is a control flow diagram of the system controller.

System controller 26 includes a control program 100 (FIG. 7). Control program 100 is initialized at 102 upon powering up of controller 26. A routine 104 determines if personal computer 32 has formulated any tasks at 106 and responds to any formulated tasks. Program 100 then composes and transmits at 108 a base data packet 50 to all remote response units 24. The program then institutes a delay 110 of finite duration to allow the remote response units 24 to prepare their responses. At the beginning of an interval 1 at 112, the system controller 26 receives a response data packet from the first keypad designated to respond, decodes the response data packet, and passes the decoded data to base personal computer 32 at 114. The program then proceeds to the next interval at 116 and receives, decodes, and passes to personal computer 32 the response data packet from the next keypad at 118. After all of the intervals have been examined, the control returns to routine 104 in order to determine whether a new task has been ordered by computer 32. The software in instructor's computer 32 may formulate a task for system controller 26 to repetitively transmit base data packets until valid responses are received from all of the remote response units, or for a designated number of cycles, or a designated length of time. Accordingly, the routine defined by steps 108–118 may be repetitively carried out under the instructions of personal computer 32 until a new task is formulated.

Figure 8:
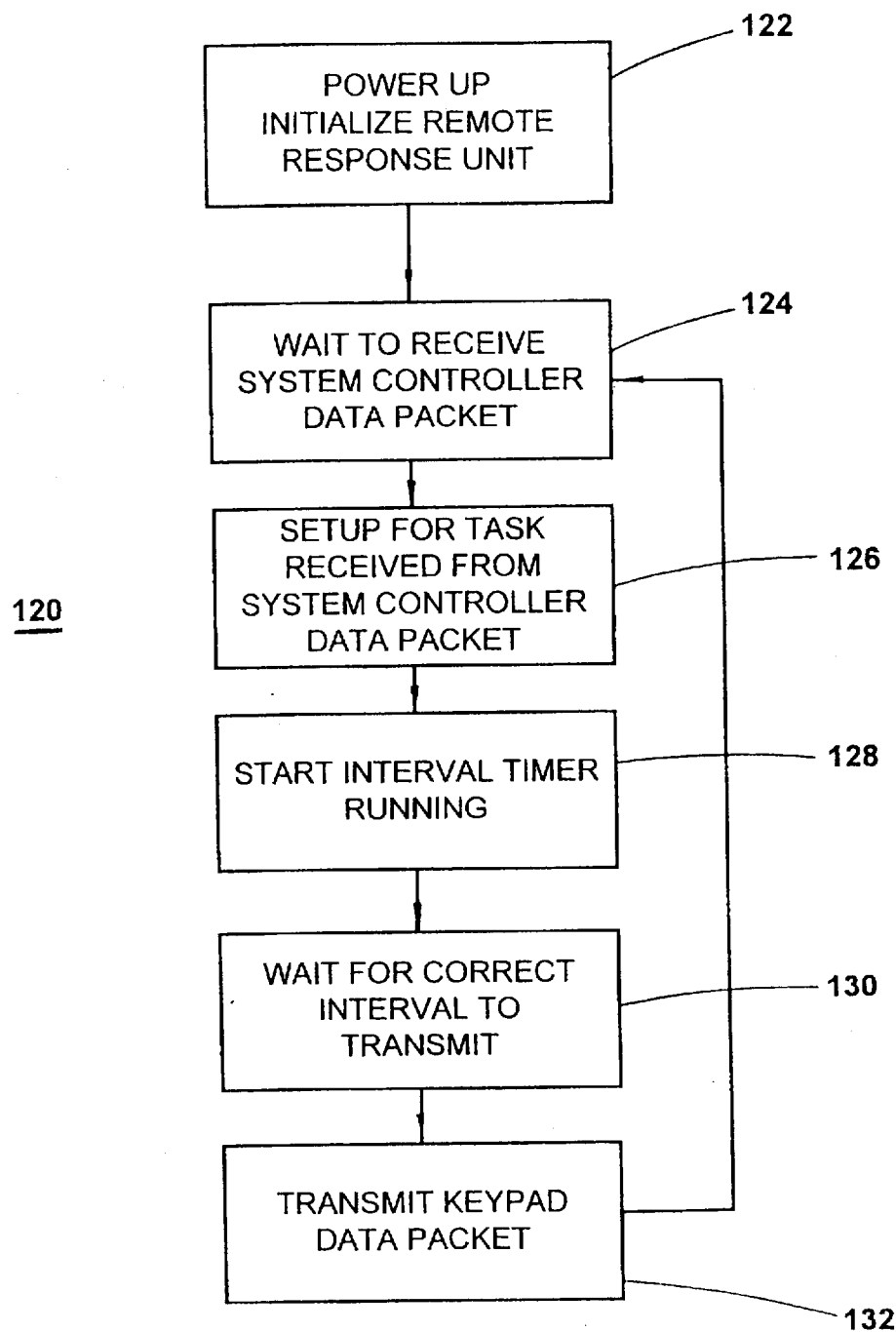
FIG. 8 is a control flow diagram of a remote response unit.

A control program 120 is repetitively carried out at each remote response unit 24 (FIG. 8). The program is initialized at 122 upon powering up of the unit and waits at 124 to receive a base data packet from system controller 26. When the base data packet is received, the remote response unit examines the characters in the HEADER field 58 in order to determine whether that particular remote response unit is within the group specified by group designator 59 to respond, at 126. The particular remote response unit additionally examines the MESSAGE field 60 and determines from Group Identity byte 70 if the content of the message field pertains to the group of which that particular response unit is a member. Each response unit within the group designated by Group Identity byte 70 examines the Acknowledge Bit field 64, correct/incorrect flag bit 66, and mike control bits 68 that pertain to that particular unit within the group and responds to the values set for those particular bits. If the Acknowledge Bit field 64 for that particular unit is set, then the system controller 26 has validly received the previous response data packet sent by that particular response unit. If the correct/incorrect flag bit 66 is set to correct, microprocessor 40' may illuminate a "correct" indicator or an "incorrect" indicator (not shown) or may provide a particular indication on display 38. In a preferred embodiment, a correct indication could be made by illuminating only the uppermost horizontal segment of a seven-segment display composing display 38 and the incorrect indication could be the lowermost horizontal segment of display 38 or vice versa. Alternatively, the microcomputer 40' may respond to a value of the correct/incorrect flag bit by displaying on indicator 38 a portion of a Global Message field 76, which pertains to correct answers, or a different portion of Global Message field 76, which pertains to an incorrect answer. If mike control bit 68 for that particular remote response unit is set, microcomputer 40' responds by actuating audio transmitter 47a in order to allow one-way audio communication between the user's microphone 46' and the instructor. Remote response unit 24 additionally responds to the Response Length Byte 72 and the base data packet length byte 74 in order to determine appropriate interval timing, as set forth above. When the setup task 126 is complete, an interval timer is run at 128 and the control waits at 130 for the appropriate interval for that particular response unit to transmit. A response data packet is transmitted at 132 during the appropriate interval.

Figure 9:
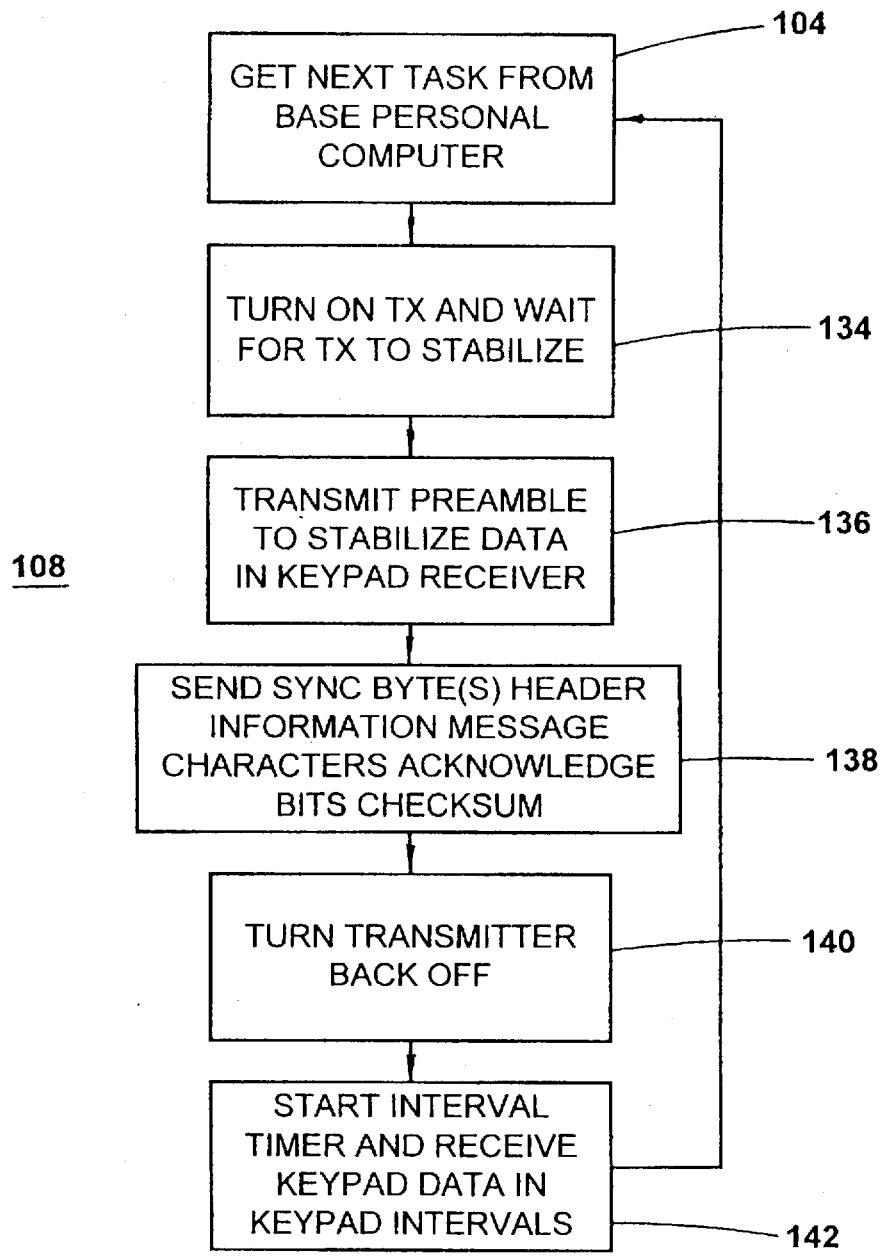
FIG. 9 is a control flow diagram of the transmit data function of the system controller.

The routine for system controller 26 to compose and transmit a base data packet 108 is further illustrated in FIG. 9. Control program 100 initiates a transmission by system controller 26 by getting any task being requested from personal computer 32 at 104. The transmitting portion of RF transceiver 42 is actuated at 134. Preamble 54 is transmitted at 136 to all of the remote response units 24 for the purpose of stabilizing the data transferred from RF transceiver 42, RF transceiver 42' to each remote response unit. The data is allowed to stabilize because the detector portion of the RF transceiver has a finite stabilizing time interval. The sync byte 56, HEADER packet 58, MESSAGE packet 58 and CHECKSUM 62 are transmitted at 138. The transmitter is then turned off at 140 and an interval timer is started at 142. The interval timer matches response data packets from the remote response units 24 with each particular response unit, decodes the packets and makes the information available to personal computer 32.

Figure 10:
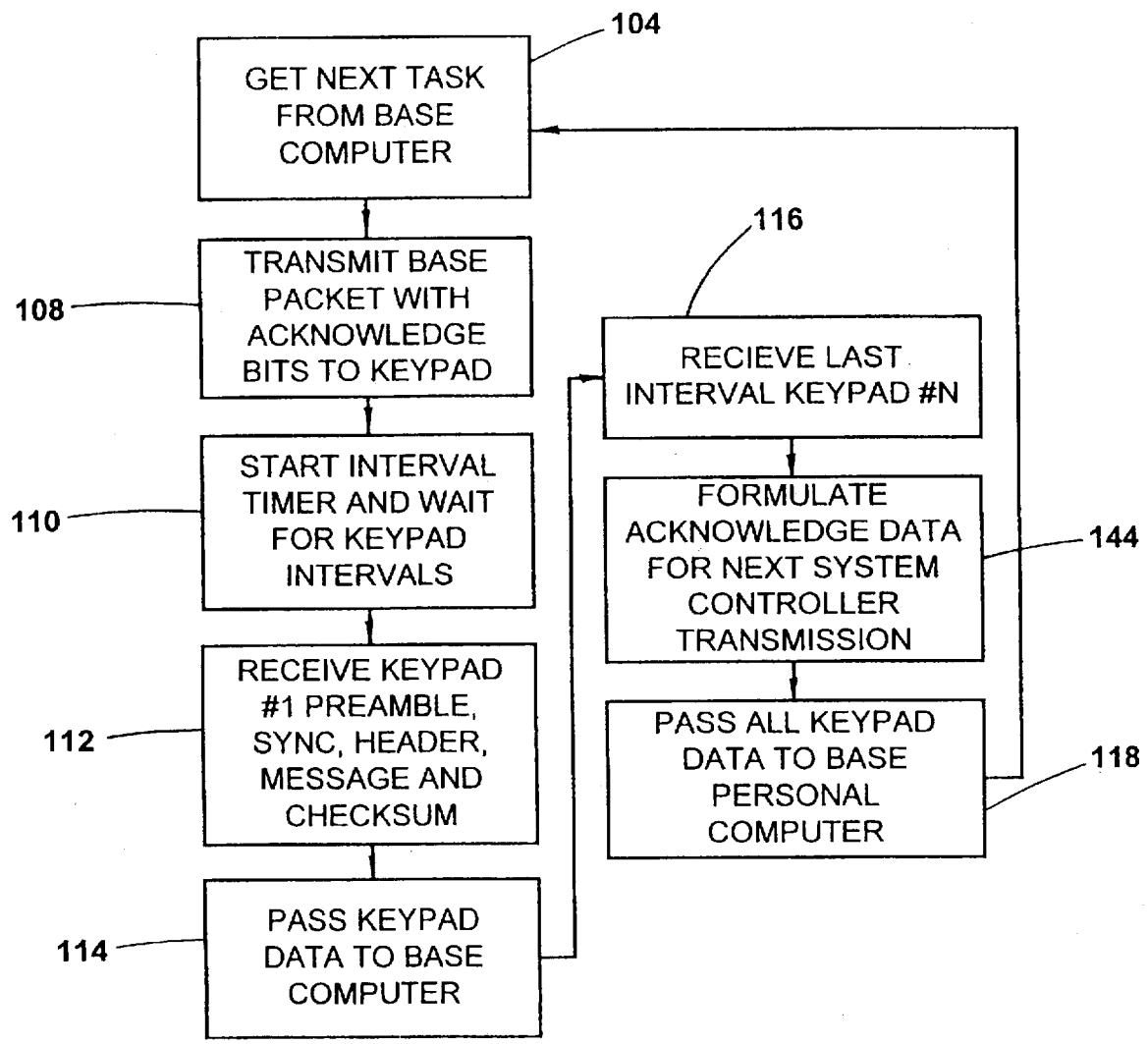
FIG. 10 is a control flow diagram of the receive data function of the system controller.

The system controller 26 receives keypad data under the control of program 100 by repetitively transmitting the base packet and monitoring subsequent intervals for response data packets from the response units (108, 110, 112, 116) (FIG. 10). The received response data packets are decoded and the data passed to computer 32 (114, 118). After an entire group of remote response units 24 have transmitted response data packets, system controller 26 compiles Acknowledge Bit field 64 at 144 from a validity test made of each received response data packet.

Figure 11:
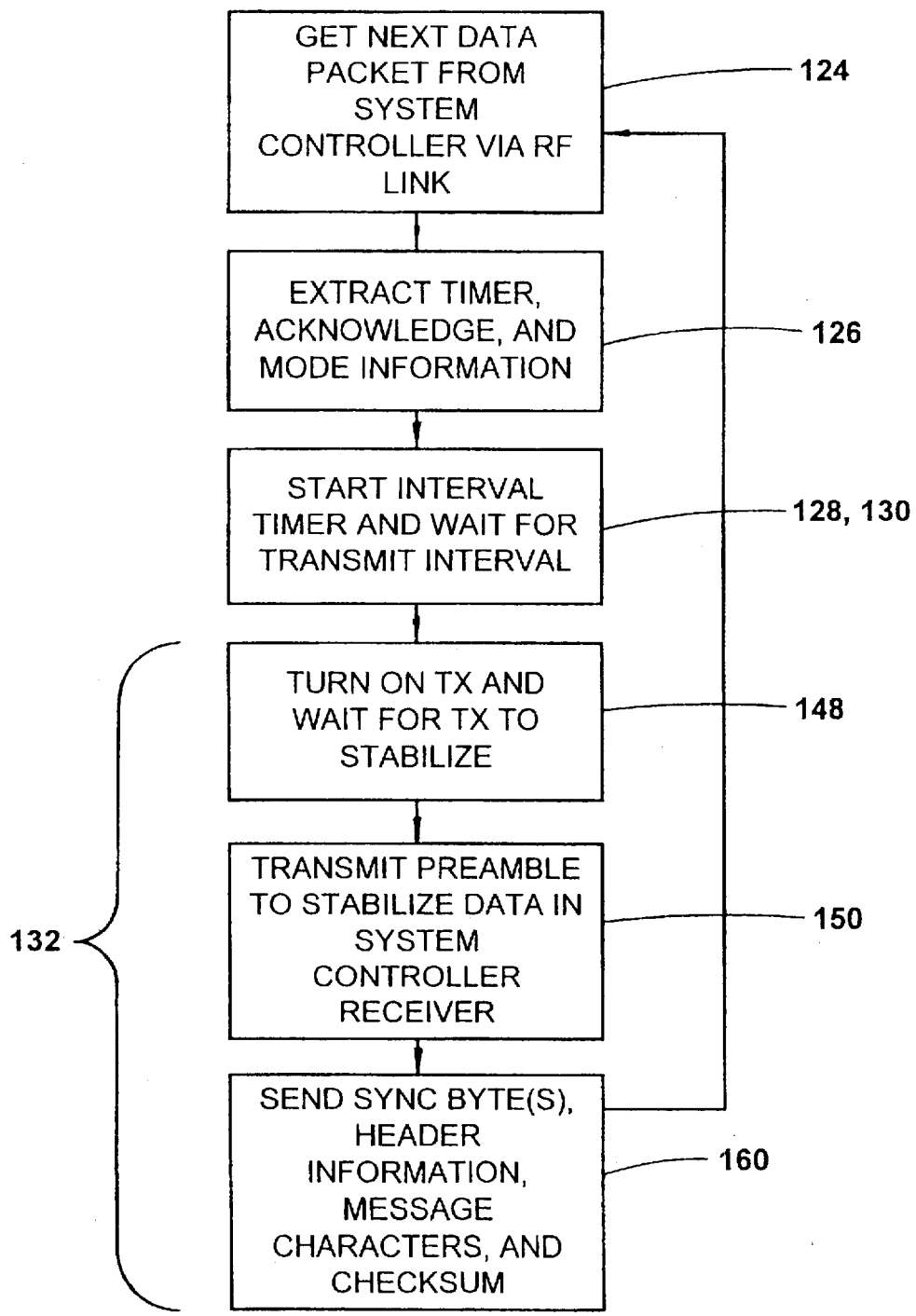
FIG. 11 is a control flow diagram of the transmit data function of the remote response units.

In order to transmit response data packets, each remote response unit 24 receives a base data packet from the system controller, at 124, over the RF link between antenna 28 and antenna 30 (FIG. 11). Microcomputer 40' decodes the received data and determines at 126 whether that remote response unit is in the group that is designated by Response Byte 59 to transmit a response and is in the group identified by Group Identity byte 70 for pertinence of MESSAGE field 60. If so, the characters in MESSAGE 60 that pertain to that particular remote response unit are extracted at 126. If the remote response unit is in the group designated by Response Byte 59 to transmit a response, microcomputer 40' then starts an interval timer and awaits the interval determined at 126 that is assigned to that particular response unit for responding. When that interval arrives, microcomputer 40' turns on RF transceiver 42' at 148 in order to stabilize the transmitter portion thereof and transmits preamble 54' in order to stabilize the data in transceiver 42 of system controller 26 at 150. Remote response unit 24 then transmits the sync byte 56', HEADER 58', MESSAGE character(s) 60' and CHECKSUM 62' to the system controller 26.

Figure 12:
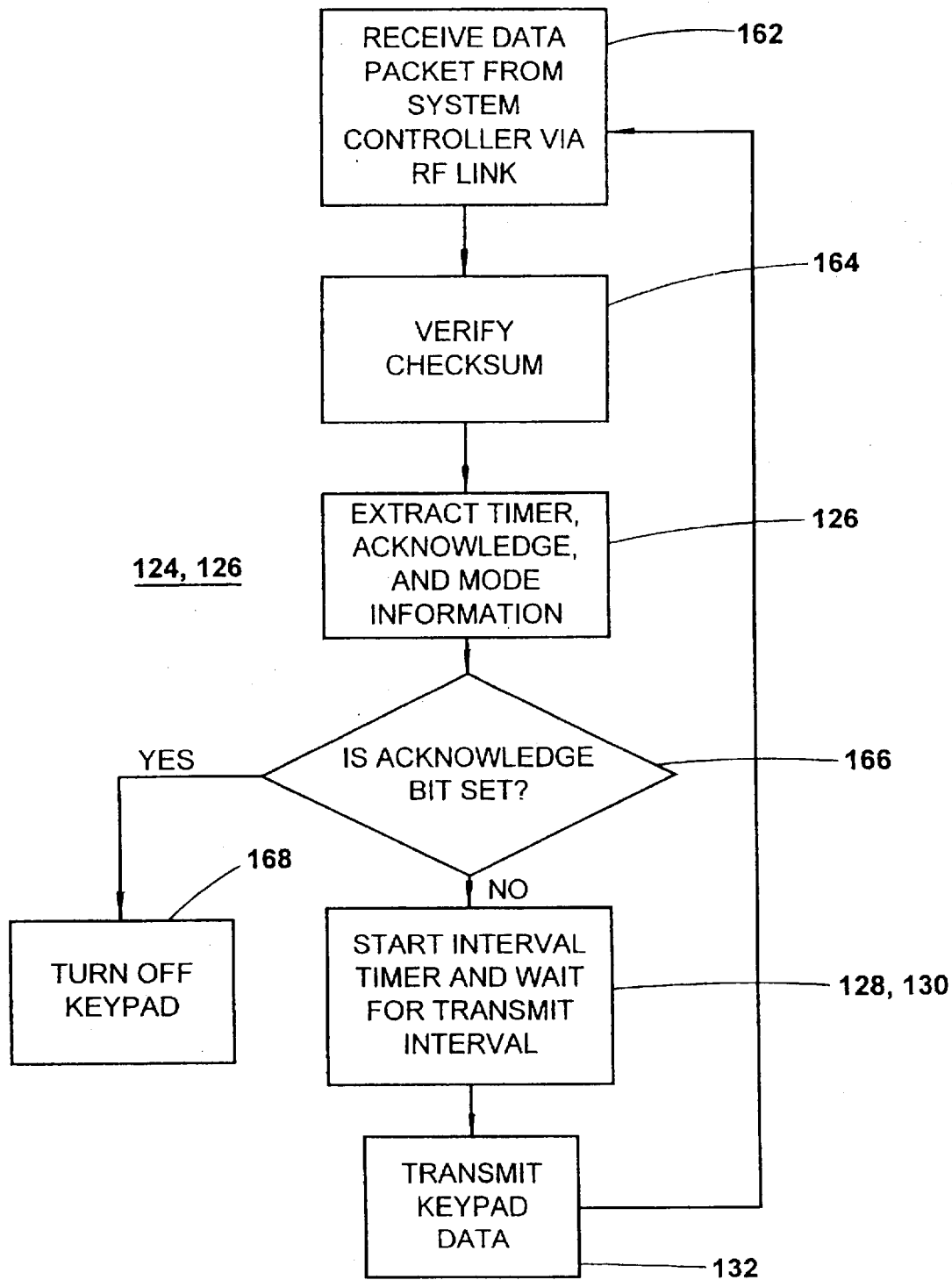
FIG. 12 is a control flow diagram of the receive data function of the remote response units.

Each remote response unit 24 receives the data packet from the system controller via RF link at 162 (FIG. 12). If all of the bits are decoded without a rejection, the CHECKSUM for the entire base data packet is verified at 164 in order to accept, or reject, the transmission. The timer, acknowledge, and mode information is extracted at 126 if the response unit is in the group designated by Group Identity Byte 70. It is then determined at 166 whether the acknowledge bit, which pertains to that particular remote response unit in Acknowledge Bit field 64, is set. If so, the transceiver 42' for that keypad is powered down at 168. If it is determined at 166 that the acknowledge bit for that particular remote response unit is not set and the remote response unit is in the group designated by Response Byte 59 to transmit a response, microcomputer 40' starts the interval timer at 128 and waits for the calculated transmit interval at 130. Remote response unit 24 transmits the response data packet at 132. If the remote response unit is not in the group designated by Response Byte 59 to transmit a response, microcomputer 44' will await its Response Byte 59 and then transmit a response data packet.

Figure 14:
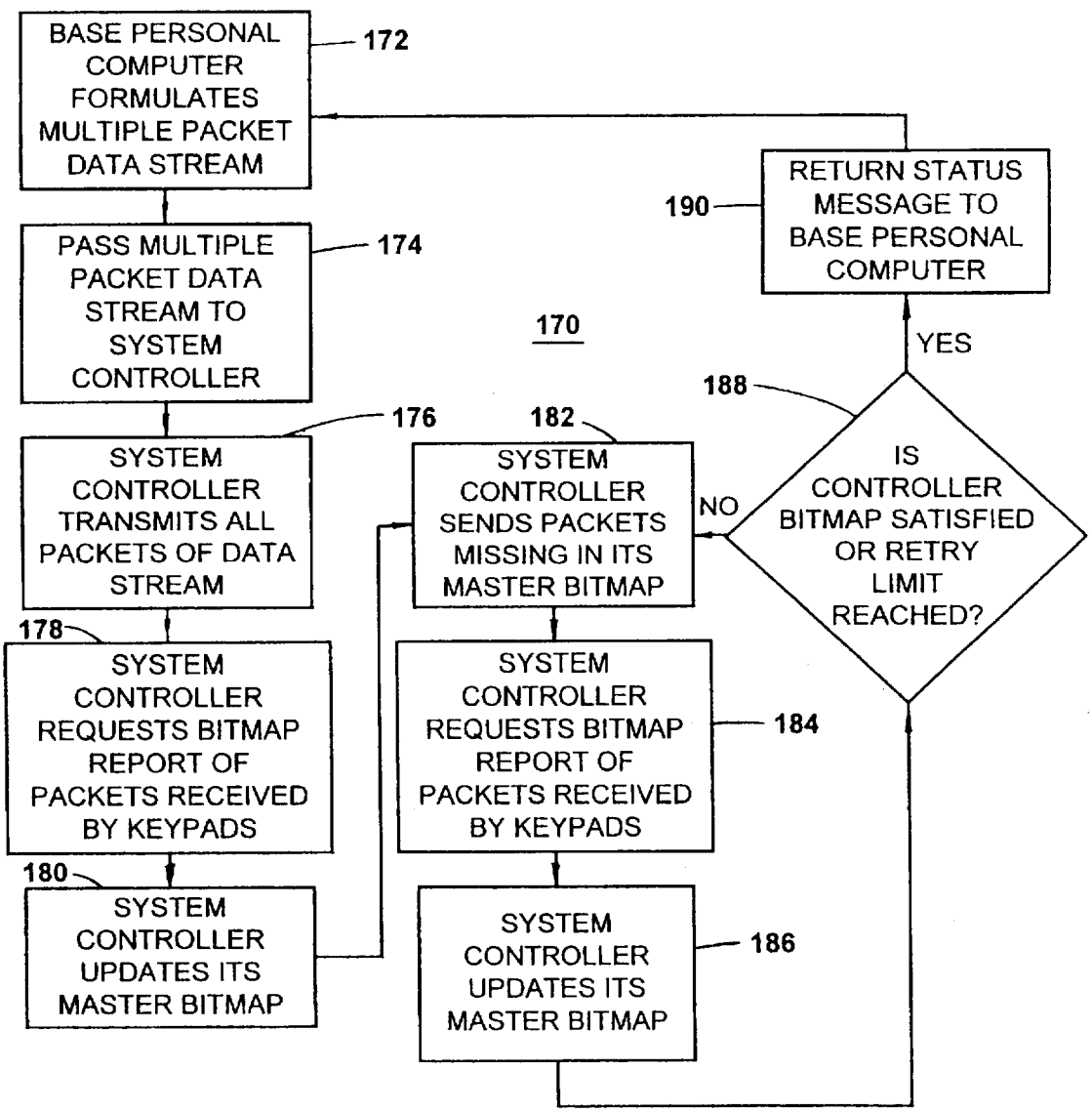
FIG. 14 is a control flow diagram of a method for efficiently transferring large blocks of data to the remote response units.

A method 170 for transferring a large block of data to all remote response units in a time-effective manner is illustrated in FIG. 14. Method 170 is initiated by the personal computer associated with system controller 26 dividing the large block of data to be transferred into a multiple-packet data stream at 172. The multiple-packet data stream is passed at 174 to the system controller 26 and is transmitted in its entirety to all remote units at 176. Each remote response unit 24 decodes the multiple-packet data stream and determines whether each packet was accurately received. A bit map is formed in each remote response unit 24 of bits indicating which packets were accurately received. The system controller 26 transmits at 178 a central data packet 50 to all remote response units 24 formatted to request the bit map reports from all of the remote response units. A bit map master is formulated or updated at 180 in the system controller 26 from response data packets 52 encoded with the bit maps of the various remote response units. The system controller examines the master bit map at 182 and sends all packets corresponding to the packets which were not accurately received by even one remote response unit, as reflected in the master bit map. The bit maps of the individual remote response units are retrieved at 184 to reflect the additional accurately received data packets in the same manner as before. The master bit map is updated at 186, and it is determined at 188 whether the number of retries specified for obtaining 100 percent accurate packet data transmission has been reached. If not, another cycle 182, 184, 186 is repeated of sending missing packets, updating the bit maps at each remote response unit, and updating the master bit map. After 100 percent accurate transmission has been achieved, or the retry limit reached, at 188, a message is sent to the base personal computer at 190. The instructor may request that additional retries be attempted or may provide a verbal instruction, to the users of the one or more remote response units which have not completely received the multiple-packet data accurately, to move to a different location in order to retry the process.

The advantage of method 170 is that the time interval required to energize the transceivers 42' of all of the remote response units 24 after each of the data packets are transmitted is avoided. This time interval may be significant because it is multiplied by each of the keypads. By breaking the bulk transmission of data into multiple data packets, only the data packets that are not accurately received at all units, are retried. This avoids the necessity for having to retry the entire bulk data transfer if one or more remote response units do not accurately receive the entire transfer.

Thus, it is seen that the present invention provides a wireless remote response system that has exceptionally good noise immunity and a tolerance for variations in the timing of transmitted signals while ensuring a virtually error-free operation. The system provides exceptional flexibility by allowing the transmittal of message data from the base unit to the remote response units in the same base data packet that synchronizes the transmittal of the response data packets from the remote response units. Advantageously, different groups of response units, which are divided into groups in order to accommodate a larger number of response units on a single RF link, may be designated by a base data packet to: (a) transmit a response data packet and (b) process the message data. The message data accommodates the disbursement of acknowledge bits, for validly received responses, in order to cause the acknowledged response units to stop transmitting. Correctness characters and microphone enable characters may additionally be transmitted in the message data and processed by the remote response units. Furthermore, the invention allows the downloading of a large field of characters globally to all of the remote response units in an efficient manner. This allows the displaying of lengthy feedback messages to the users, for example, in response to correct or incorrect answers, as well as the downloading of operating code for the individual remote response units and the downloading of code for other purposes. Furthermore, the ability of the base unit to instruct the remote response units of the length of the intended response from each of the remote response units, and the ability of the remote response units to respond to such designation by structuring a suitable response data packet, allows the retrieval of responses that are more complex than a single character.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A wireless method of retrieving at a base unit responses from a plurality of users, said responses being entered in a plurality of remote response units, each user being provided with a response unit, including:

transmitting a base data packet over a wireless communication link to said plurality of remote response units;

decoding said base data packet at each response unit and loading into memory at least a portion of the decoded base data packet at each response unit, wherein said portion of the decoded base packet includes a plurality of characters, at least a portion of said plurality of characters pertaining to different response units;

determining at each response unit any character of said portion of the decoded base data packet that pertains to that particular response unit; and processing by each remote response unit any character that pertains to that particular remote response unit, including transmitting in a response data packet over a wireless communication link from that particular remote response unit to the base unit any response entered by a user.

2. The method of claim 1 wherein said plurality of characters includes acknowledge characters, each indicative of whether a valid response was previously received from a particular response unit.

3. The method of claim 2, wherein said processing any character includes terminating transmission of a response entered by a user in response to an acknowledge character pertaining to that particular response unit.

4. The method of claim 1 wherein said plurality of characters includes correctness characters, each indicative of whether a previously received response matches a correct answer in an answer key.

5. The method of claim 4 wherein said portion of the decoded base packet includes another plurality of characters pertaining to all said response units, wherein a particular response unit displays a first message contained in said another plurality of characters in response to a given value of the correctness character pertaining to that particular response unit and displays a second message contained in said another plurality of characters in response to a different value of the correctness character pertaining to that particular response unit.

6. The method of claim 4 wherein each response unit displays the value of the correctness character pertaining to that particular response unit.

7. The method of claim 1 wherein said plurality of characters includes microphone activation characters, each for activating an audio communication link with a particular response unit.

8. The method of claim 7 wherein said response units includes a microphone and an audio communication link with said base unit and wherein a particular response unit opens the audio communication link between the microphone of that particular response unit and the base unit in response to said microphone activation character pertaining to that particular response unit.

9. The method of claim 1 wherein said remote response units are divided into groups and wherein said decoded base data packet includes a designation of a group of response units to which said plurality of characters pertain.

10. The method of claim 1 wherein said remote response units are divided into groups and wherein said decoded base data packet includes a first designation of a particular group of response units to which said plurality of characters pertain and a second designation of a particular group of response units to transmit a response data packet.

11. The method of claim 1 wherein said remote response units are divided into groups and wherein said decoded base data packet includes a designation of a particular group of response units to transmit a response data packet.

12. The method of claim 11 including providing a unique identification to each of said number of response units and determining at each of said number of response units a response interval following said base data packet as a function of said designation of a particular group of response units and the identification of a particular response unit.

13. The method of claim 12 wherein said decoded base data packet includes a designation of the number of characters making up a response data packet and wherein said determining is also a function of said number of characters.

14. The method of claim 1 wherein said decoded base data packet includes a designation of the number of characters making up a response data packet.

15. The method of claim 14 wherein each response unit transmits a response data packet having the number of characters designated in said decoded base data packet.

16. The method of claim 1 wherein each of said remote response units includes a microcomputer having erasable memory and wherein said portion of the decoded base data packet includes operating code and wherein said processing includes storing said operating code in said erasable memory for operating said microcomputer.

17. The method of claim 16 wherein said transmitting a response data packet includes transmitting a null response data packet when a user has not entered a response.

18. The method of claim 1 wherein said transmitting a response data packet includes transmitting a null response data packet when a user has not entered a response.

19. The method of claim 1 wherein said portion of the decoded base data packet includes a plurality of characters globally pertaining to a plurality of remote response units.

20. The method of claim 19 including transmitting a plurality of base data packets, each including a plurality of characters globally pertaining to a plurality of remote response units, determining at each remote response unit which of said base data packets is validly received, and transmitting from each said remote response unit an indication of which base data packets were validly received at that remote response unit.

21. The method of claim 20 further including assembling a bit map at said base unit of all base data packets validly received at said remote response units and repetitively retransmitting ones of said base data packets which said bit map indicates were not validly received at at least one said remote response unit.

22. The method of claim 1 wherein said response data packet includes multiple character responses.

23. A wireless method of retrieving at a base unit responses from a plurality of users, said responses being entered in a plurality of remote response units, each user being provided with a response unit, including:
transmitting a base data packet over a wireless communication link that is subject to variation in timing between rising and falling edges of transmitted data from said base unit and receiving the transmitted base data packet by said plurality of remote response units and transmitting a response data packet over a wireless communication link that is subject to variation in timing between rising and falling edges of transmitted data from at least one of said remote response units to said base unit and receiving the transmitted response data packet by said base unit, said response data packet containing any response entered by a user;
wherein at least one of said transmitting a base data packet and transmitting a response data packet includes encoding the respective data packet by varying the time period for at least one cycle of a periodic waveform of a transmitted signal to encode a value of each bit, and wherein at least one of said receiving the transmitted base data packet and receiving the transmitted response data packet includes decoding the respective data by measuring time intervals for at least one cycle of a received signal; and
determining whether each of said time intervals falls within one of at least two distinct, non-overlapping time ranges in order to decode a value of each bit and ignoring the respective data if at least one of said measured time intervals does not fall within one of said distinct, non-overlapping time ranges.

24. The method of claim 23 wherein said at least one cycle of a periodic waveform of a transmitted signal is measured either between successive rising edges or between successive falling edges of the respective waveform.

25. The method of claim 23 wherein said encoding includes determining whether a majority of bits in a data packet are of a value that would be encoded for a longer time period and inverting said bits in said data packet prior to encoding the respective data packet in order to reduce the time required to transmit the data packet.

26. The method of claim 25 wherein said at least one of said transmitting a base data packet and transmitting a response data packet includes transmitting an indication that said bits in said data packet have been inverted.

27. A wireless method of retrieving at a base unit responses from a plurality of users, said responses being entered in a plurality of remote response units, each user being provided with a response unit, including:
transmitting a base data packet over a wireless communication link to said plurality of remote response units, said base data packet including a designation of at least one characteristic of a response data packet;
at least one said response unit responding to said base data packet by transmitting in a response data packet over a wireless communication link any response entered by a user, wherein a characteristic of said response data packet is defined at least in part by said designation, wherein said characteristic is a number of characters making up a response data packet, whereby said response data packet length is controlled with said base data packet.

28. The method of claim 27 wherein said base data packet includes a designation of a characteristic of said base data packet.

29. The method of claim 28 wherein said characteristic of said base data packet is a number of characters making up said base data packet.

30. The method of claim 28 including providing a unique identification to each of said response units and determining at each of said response units a response interval following said base data packet as a function of said characteristic of said base data packet and the unique identification of that response unit.

31. The method of claim 27 including dividing said remote response units into a plurality of groups and wherein said base data packet includes a designation of a group of response units to respond to said base data packet.

32. The method of claim 27 wherein said transmitting a response data packet includes transmitting a null response data packet when a user has not entered a response.

33. A method of communicating a data packet made up of a plurality of data bits over a wireless communication link that is subject to variation in timing between rising and falling edges of transmitted data, including:
encoding the respective data packet by varying the time period either between successive rising edges or between successive falling edges of a periodic waveform of a signal to encode a value of each bit in an encoded data signal;
transmitting the encoded data signal over a wireless communication link that is subject to variation in timing between rising and falling edges of transmitted data;

receiving the transmitted encoded data signal and decoding the received data signal by measuring time intervals either between successive rising edges or between successive falling edges of the received data signal and determining whether each measured time interval falls within one of at least two distinct non-overlapping time ranges in order to decode a value of each bit; and determining whether a majority of bits in a data packet are of a value that would be encoded for a longer time period and inverting said bits in said data packet prior to encoding in order to reduce the time required to transmit a data word.

34. The method of claim 33 including transmitting an indication that said bits in a data packet have been inverted.

35. A wireless remote response system comprising:

a base unit, a plurality of remote response units and a wireless communication link between said base unit and each of said response units;

a first microcomputer in said base data programmed to assemble a base data packet, encode said base data packet and communicate the encoded base data packet over said communication link to said plurality of remote response units;

a second microcomputer in each of said remote response units programmed to decode a base data packet received from said base unit, to load into a memory a portion of the decoded base data packet wherein said portion of the decoded base packet includes a plurality of characters, at least a portion of said plurality of characters pertaining to different response units, and said second microcomputer in each of said remote response units programmed to determine any character of said portion of the decoded base packet that pertains to that particular response unit;

an input device in each of said remote response units for receiving a user response selection;

each said second microcomputer further programmed to process any character that in said memory pertains to that particular response unit and to assemble a response data packet in response to a user entering a selection with said input device, encode the response data packet and transmit the encoded response data packet over the wireless communication link from that particular response unit to the base unit; and said first microcomputer programmed to decode response data packets received from each of said response units.

36. The system in claim 35 wherein said plurality of characters includes acknowledge characters, each indicative of whether said base unit receives a valid response data packet from a particular response unit.

37. The system in claim 36 wherein said second microcomputer is programmed to discontinue transmission of a response data packet when that second microcomputer determines an acknowledge character in said portion of the decoded base data packet that pertains to that particular response unit.

38. The system in claim 35 wherein said plurality of characters includes correctness characters, each indicative of whether a previously received response matches a correct answer in an answer key.

39. The system of claim 38 wherein the portion of the decoded base packet includes another plurality of characters pertaining to all said response units, wherein said second microcomputer of a particular response unit is programmed to display a first message contained in said another plurality of characters in response to a given value of the correctness character pertaining to that particular response unit and to display a second message contained in said another plurality of characters in response to a different value of the correctness character pertaining to that particular response unit.

40. The system in claim 38 wherein said second microcomputer in each response unit is programmed to display the value of the correctness character pertaining to that particular response unit.

41. The system in claim 35 wherein said plurality of the character includes a microphone activation character, each for activating an audio communication channel with a particular response unit.

42. The system in claim 41 wherein said response units include a microphone and an audio communication channel with a base station and wherein said second microcomputer of a particular response unit opens the audio communication channel between the microphone of that particular response unit and the base station in response to said microphone activation character pertaining to that particular response unit.

43. The system in claim 35 wherein said remote response units are divided into groups and wherein said decoded base data packet includes a designation of a group of response units to which said plurality of characters pertain.

44. The system in claim 35 wherein said remote response units are divided into groups and wherein said decoded base data packet includes a first designation of a group of response units to which said plurality of characters pertain and a second designation of a group of response units to transmit response data packets.

45. The system in claim 35 wherein said remote response units are divided into groups and wherein said decoded base data packet includes a designation of a group of response units to transmit response data packets.

46. The system in claim 45 wherein each of said response units is assigned a unique identification and wherein said second microcomputer is programmed to determine a response interval following said base data packet within which the associated response unit is to transmit a response data packet as a function of said designation of a particular group of response units and the unique identification of a particular response unit.

47. The system in claim 35 wherein said decoded base data packet includes a designation of a number of characters making up said base data packet and wherein said second microcomputer determines said response interval as a function of said number of characters.

48. The system in claim 35 wherein said decoded base data packet includes a designation of the number of characters making up the response data packet and wherein said second microcomputer is programmed to assemble a response data packet having said number of characters.

49. The system in claim 35 wherein said portion of the decoded base data packet includes operating code and wherein said second microcomputer is programmed to store said operating code in memory for use in operating said second microcomputer.

50. The system in claim 35 wherein said second microcomputer is programmed to assemble a null response data packet not including a selection when a user has not entered a selection, to encode the null response data packet and transmit the encoded null response data packet over the wireless communication link from that particular response unit to the base unit.

51. The system in claim 35 wherein said response data packet includes user selections made up of a plurality of characters.

52. The system in claim 35 wherein each of said first and second microcomputers is programmed to encode the respective data packet by varying the time period either between successive rising edges or between successive falling edges of a periodic waveform to encode a value of each bit making up the data packet, and decode the respective data packet by measuring time intervals either between successive rising edges or between successive falling edges of a received signal.

53. The system in claim 52 wherein each of said first and second microcomputers is further programmed to determine whether each measured time interval falls with in one of at least two distinct non-overlapping time ranges to decode a value of each bit.

54. The system in claim 52 wherein each of said first and second microcomputers is programmed to determine whether a majority of bits in a data packet are of a value that would be encoded for a longer time period and to invert said bits of said data packet prior to encoding in order to reduce the time required to transmit a data packet.

55. The system in claim 54 wherein each of said first and second microcomputers is programmed to transmit an indication that said bits in a data packet have been inverted.

56. The system in claim 35 wherein said first microcomputer is programmed to assemble, encode, and communicate a plurality of base data packets, each including a plurality of characters globally pertaining to a plurality of said remote response units, and wherein each said second microcomputer of said plurality of remote response units is programmed to determine which of said base data packets is validly received and to assemble, encode, and transmit a response data packet including indications of which base data packets were validly received at that remote response unit.

57. The system in claim 56 wherein said first microcomputer is programmed to assemble a bit map from said response data packets and to repetitively retransmit ones of said base data packets which said bit map indicates were not validly received.

* * * * *